United States Patent [19]

Casteel

[11] Patent Number: 4,650,392
[45] Date of Patent: Mar. 17, 1987

[54] APPARATUS FOR PRE-ASSEMBLING AND LIFTING A STRUCTURE

[76] Inventor: Joseph M. Casteel, 255 Lytton Rd., Coraopolis, Pa. 15108

[21] Appl. No.: 772,046

[22] Filed: Sep. 3, 1985

[51] Int. Cl.⁴ ............................................. B25B 1/22
[52] U.S. Cl. ................................. 414/680; 212/265; 269/17; 269/69; 269/152; 414/10
[58] Field of Search .................... 414/10, 11, 12, 680; 212/254, 265; 269/17, 20, 25, 69, 152, 900, 910

[56] References Cited

U.S. PATENT DOCUMENTS

| | | | |
|---|---|---|---|
| 2,828,870 | 4/1958 | Corley | 414/11 |
| 2,904,087 | 9/1959 | Walthall | 269/17 |
| 3,221,900 | 12/1965 | Love | 414/11 |
| 3,643,935 | 2/1972 | Bell | 269/17 X |
| 3,905,495 | 9/1975 | Wayne | 414/680 X |
| 4,491,305 | 1/1985 | Walters | 269/17 |
| 4,531,720 | 7/1985 | Soder | 414/11 X |

*Primary Examiner*—Joseph E. Valenza
*Assistant Examiner*—Donald W. Underwood

*Attorney, Agent, or Firm*—William J. Ruano

[57] ABSTRACT

A crane-like apparatus for enabling easy assembly and easy lifting from a horizontal to a vertical position of a structure. The apparatus comprises two (or more) clamping arms attached to the pivotally mounted mast of the apparatus with clamping means mounted on clamping arms at selective positions along the lengths thereof, such as by providing a plurality of spaced holes through which mounting bolts may be selectively fastened. The clamping means comprises a hydraulic cylinder on one end of the clamping arms and either another hydraulic cylinder, or a dummy cylinder or stop, on the other end so that the structure to be assembled may be clamped therebetween by application of hydraulic fluid to the cylinder, thus not marring the surface of the structure. Thus, the structure can be assembled while clamped in the horizontal position of the mast to enable easy reach and assembly; and thereafter, clamped by the hydraulic means and lifted to a vertical position so that it can be wheeled to any desired location for vertical mounting.

1 Claim, 5 Drawing Figures

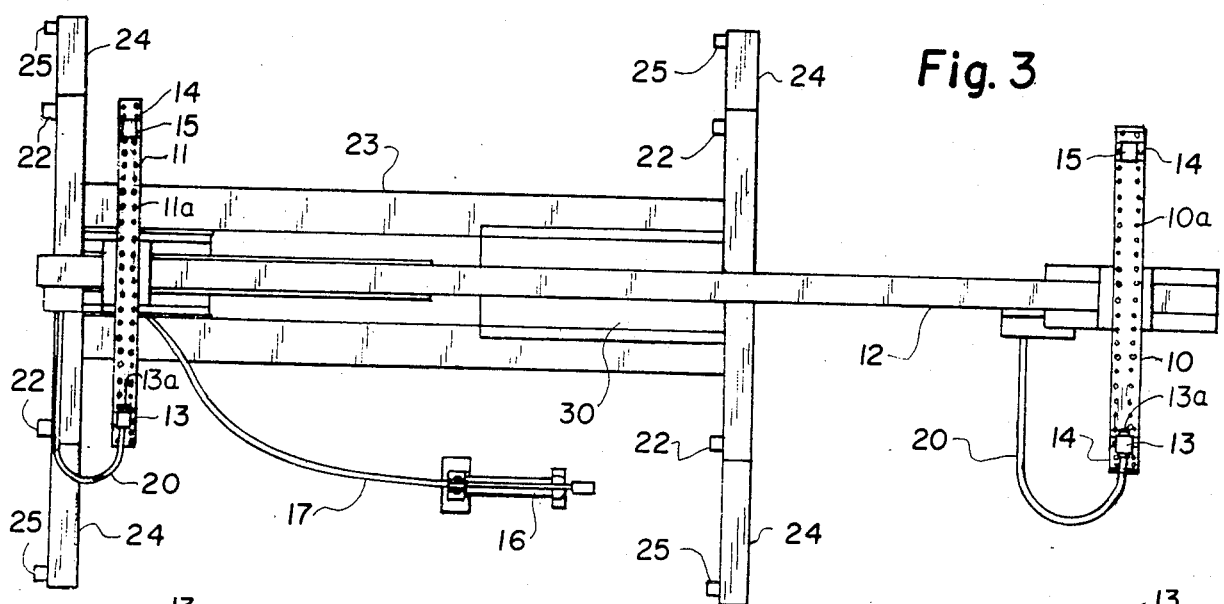
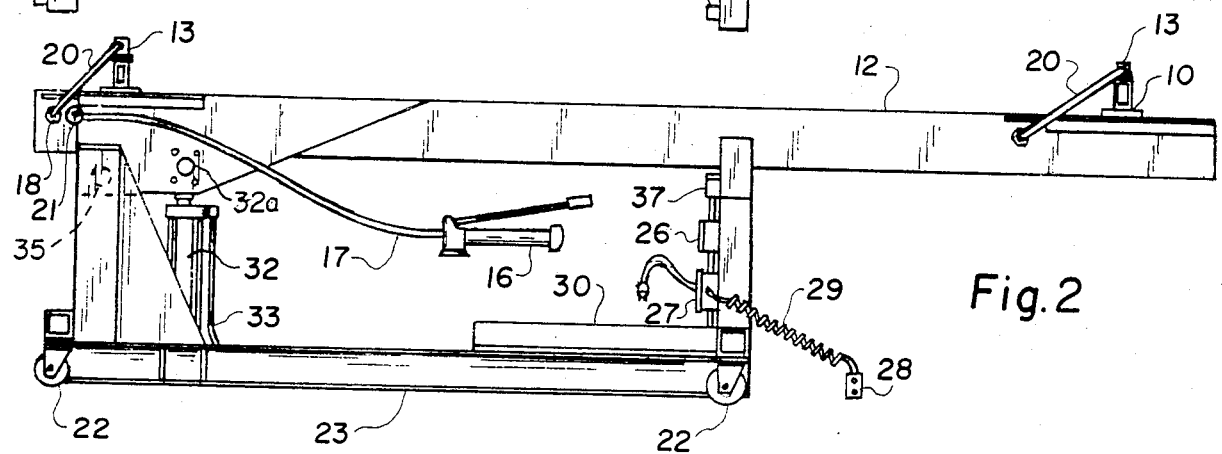
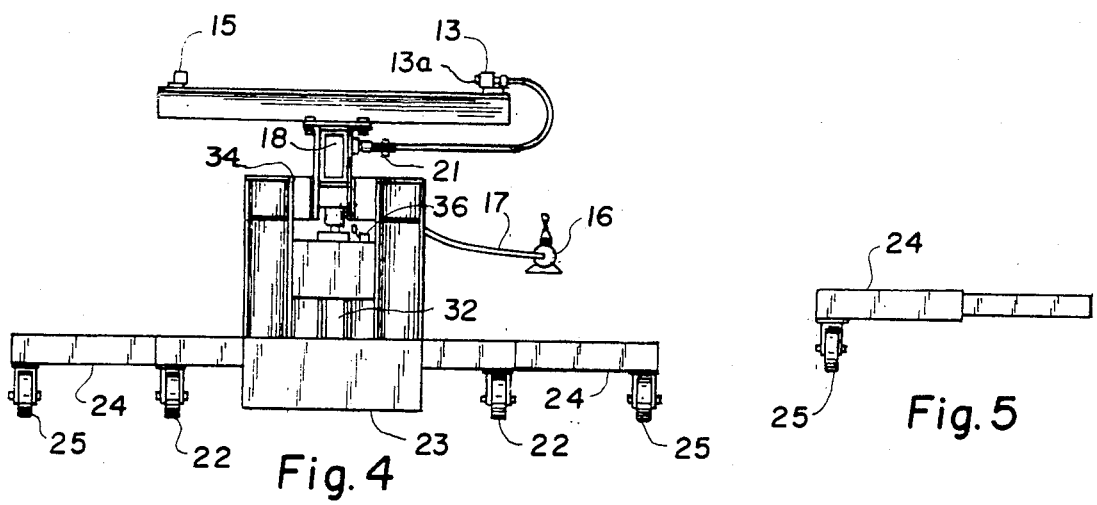
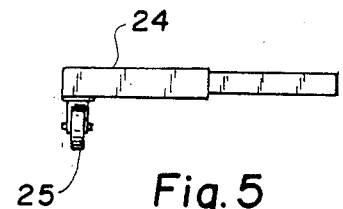

APPARATUS FOR PRE-ASSEMBLING AND LIFTING A STRUCTURE

This invention relates to a method and equipment required to allow preassembly of vertical structures in a horizontal plane and then raise, locate and place the structures accurately with great efficiency.

This invention permits the user a fixture to assemble large and/or long poorly balanced vertical structures.

Move said structures without releasing it from the fixture with a minimum of effort, safely to another location.

Raise to a vertical position said structure hydraulically while maintaining complete control, permitting effortless placement of the raised structure in its' final position.

Holds structure without interference in final position while permanent connections are made.

BACKGROUND OF THE STRUCTURE

Several methods are presently used and in combinations thereof which should be considered the state of the art. These consist of using a crane and/or forklift trucks to raise the unassembled vertical member into place, then attach as required, the balance of the structure, raising each piece individually. In other cases, the vertical structure is assembled in the horizontal position at ground or floor level. This method, using the present state of the art, is limited by the following: rigidity and strength of the assembled vertical structure in the horizontal position; balance that will permit controlled raising of the structure; available space to permit assembly at the point of erection; maneuverability of the lifting device and the ability of this device to gain access to the site or location. The problems are particularly acute in the erection of storage racks which have long slender vertical members (several feet in length to 60 or 70 feet long) which have many horizontal members. This type of structure is generally installed in a completed structure or building with no or poor access for a crane. In addition, very little maneuvering room is available particularly near completion when most floor area has been consumed. The lift truck, although smaller and more maneuverable, has great difficulty lifting a load off-center particularly when the mast is extended. This is true because the lift must engage the vertical member column at right angles keeping clear of the horizontal members and above the balance point. This produces a side thrust as the lift truck mast is raised. Lifting from the top of the vertical member would require a forklift truck which has a lifting capacity in excess of the vertical member to be raised. In many cases, lifts of this capacity are rare, very expensive and lack maneuverability. It is also necessary to drive forward as the structure is raised or drag it to the lift.

Regardless of the device used, a number of shortcomings become evident. These include:
1. Access to the immediate erection site.
2. Space to maneuver heavy or large equipment.
3. Space above the installed vertical members.
4. Availability of the exceptionally high lift capacity for lift trucks.
5. Poor structural integrity of the vertical member when lifted from the horizontal position, particularly when preassembled.
6. Difficulty moving an assembled member from the assembly area to a point of erection.
7. Space requirements when assembling in a horizontal position.
8. Positioning at the assembly point so that the work can be performed on both sides or bottom and top.
9. Raising to vertical, a column or structural member, where interference may exist in the ceiling area such as water, steam or electrical lines. This might require raising in a clear area and moving in the raised vertical position to the installation point.
10. Control and placement of an assembled column or a vertical member due to the poor balance resulting from the cantilever type structure.
11. The need for qualified, highly trained equipment operators.
12. Very expensive equipment to either rent or buy and comparably high maintenance and operating costs.

In addition to the many disadvantages as previously outlined, it should be noted that in the erection of pallet storage rack, or selective rack as it is sometimes called, I have never witnessed, nor am I aware of the raising of a fully assembled column with its' horizontal members in place using the present state of the art system or equipment, for many of the reasons stated above to include and particularly the strength of the column and balance of the members assembled.

SUMMARY OF THE INVENTION

This invention, to include the system and equipment as proposed herein, resolves almost all of the shortcomings as previously described. It is compact and transportable by a standard pickup truck, can gain access through a standard man door, will operate in any aisleway 4 feet or larger, provide transportation from a material storage point to an assembly area and on to the erection point, allow complete assembly of all components while holding them securely in place, permit almost effortless movement of the assembled structure to the point of erection, raise the structure to a vertical position at the installation site or at some other more convenient location, provide almost effortless movement and exact placement at the erection point and securely hold the structure while it is permanently secured. This entire operation could in fact be accomplished by one person safely with a minimum of effort. This system is particularly applicable to the erection of most vertical structures within a limited access area of a completed building or similar structure and in particular for storage rack and any vertical structure to be set or placed in a confined area or upper level of a structure where forklift trucks and/or cranes have no access and where preassembly in the horizontal position is desirable and cost effective.

BRIEF DESCRIPTION OF THE DRAWINGS

For a better understanding of the invention, references may be had to the preferred embodiment exemplary of the invention shown in the accompanying drawings in which:

FIG. 2 is a side view of the device;

FIG. 3 is a top view of the device;

FIG. 4 is an aft end view of the device; and

FIG. 5 is a side view of outrigger removed from the device.

DESCRIPTION OF THE PREFERRED EMBODIMENT

Figure 1:
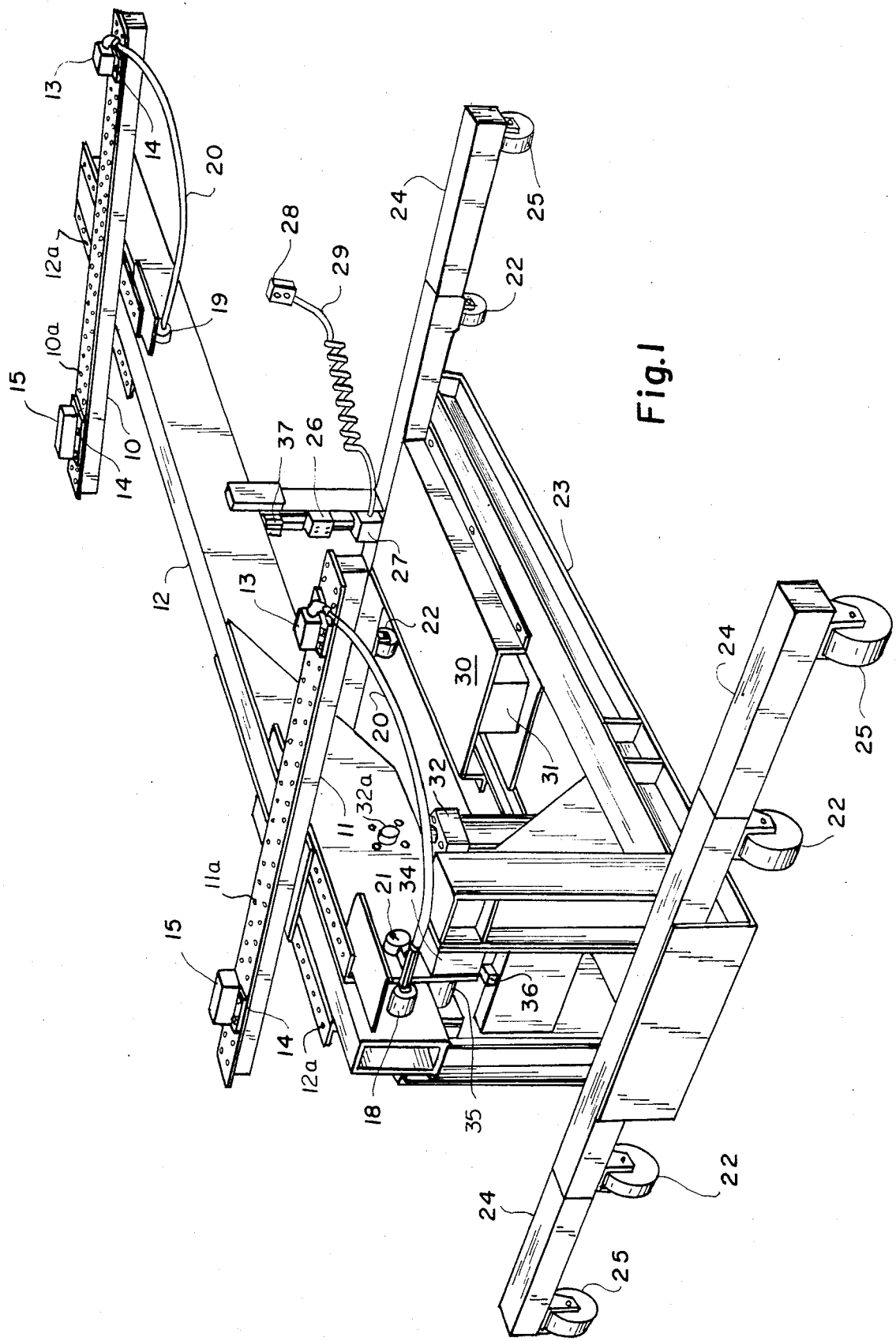
FIG. 1 is an isometric view of the lifting device embodying the present invention.

Referring to the drawings, FIGS. 1-5 show a hydraulic lifting device and work stations constructed in accordance with the teaching of the present invention.

The device, FIG. 1, is positioned at a loading point or staging area. The forward clamping arm 10 and the aft clamping arm 11 are adjusted forward or aft along the mast weldment 12 to locate the proper or desired clamping point. These clamping arms 10 and 11 are secured by bolts to a welded protrusion on the top surface of the mast weldment 12 through a series of holes permitting incremental adjustments along the longitudinal plane of the device.

A column or similar structure to be raised or assembled is placed onto the clamping arms 10 and 11. Adjustment is then made to the clamping cylinders 13 located on each arm 10 and 11. A dummy cylinder block 15 is located opposite each clamping cylinder 13. Both the dummy cylinder block 15 and the clamping cylinders 13 are adjusted by means of a series of holes located in the plated top of the clamping arms 10 and 11 and by a series of tapped holes in the clamping shims 14. This permits adjustment from zero to the full width of both clamping arms 10 and 11. Hydraulic force is supplied to each clamping cylinder 13 by means of a portable, hand operated, high pressure hydraulic pump 16 through a flexible hose 17 attached at a feed through fitting 18 located at the aft end of the mast weldment 12. A manifold tube, not shown, runs from the aft feed through fitting 18 to the forward feed through fitting 19, hence through a flexible, high pressure hose 20, to the clamping cylinder 13. An additional high pressure hose 20 feeds the aft clamping cylinder 13 from the aft feed through fitting 18. A gauge 21 installed on the aft feed through fitting 18 monitors hydraulic pressure in the manual clamping system. This permits the operator precise control of the clamping pressure to prevent damage to the structure held and to insure sufficient force is maintained in the system to safely hold the structure when raised or positioned. Once sufficient and proper pressure has been applied to the clamping cylinders 13 and the work is held securely, by piston 13a, the device may then be moved or relocated if required to facilitate raising and/or further assembly. Movement of the device is accomplished manually with little effort on four permanently mounted steel swivel caster wheels 22 attached to the four horizontal tubular projections of the frame weldment 23 at each corner. Construction of the frame weldment 23 and the placement of the casters 22 in this manner allow free access inside the perimeter of the device, FIG. 1, during assembly work and allow the device, FIG. 1, passage through an entrance slightly larger than ½ the width. Outriggers 24 with swivel casters 25 are provided and may be installed if required to stabilize the device. These are slipped into the square tube projections on the frame weldment 23 at each corner. When assembling a vertical structure in the horizontal position, this device, FIG. 1, is used as a positioning or holding fixutre by the means previously described.

A ground fault protected duplex receptacle 26 is available located on the forward end of the frame weldment 23 supplying line voltage to facilitate the safe use of power tools eliminating the need for additional extension power cords. This power is derived from a junction box 27 also located on the forward end of the frame weldment 23. To raise an assembled vertical structure or column, a push button station 28 is provided with a retractable cord 29 attached to a junction box 27 at the forward end of the frame weldment 23. By depressing the up button, a relay (not shown) is operated in a motor controller located beneath the cover 30 and forward of the hydraulic power pack 31 beneath the junction box 27, thus operating the raise or up selenoid valve on the hydraulic power pack 31 and starting the pump motor. This power pack 31 is a self-contained hydraulic power unit having a motor, selenoid valve, pump and oil reservoir. Pressure developed at the hydraulic power pack 31 is transmitted to the lifting cylinder 32 through a medium pressure flexible hose 33 causing the lifting cylinder 32 to exert force on the mast weldment 12. Force is also exerted against the frame weldment 23 where the lifting cylinder 32 is attached at its' base. At this attachment, the lifting cylinder 32 base is permitted to rotate on large heavy duty roller bearings (not shown) mounted in bearing retainer blocks 34 on both sides of the lifting cylinder 32 base. These bearing retainer blocks 34 are securely mounted to the frame weldment 23 by means of high strength bolts. The rod end, or upper end of the lifting cylinder 32 is attached by a large pin (not shown) through a spherical bearing type rod end (not shown) which permits some misalignment and smooth operation of the lifting cylinder 32. As the lifting cylinder 32 is extended, the mast weldment 12 raises at the lifting cylinder 32 attachment point but is held fast at a point located aft of the lifting cylinder 32 and is secured to the frame weldment 23 by a shaft secured to the frame weldment by large heavy duty roller bearings (not shown) enclosed in the bearing retainer blocks 34 which are attached to the frame weldment 23 with high strength bolts. Lateral movement of the mast weldment is prevented by the rigidity of the frame weldment 23 at this attachment point permitting only rotation on one axis, thus permitting the mast weldment 12 to raise at its' forward or free end. The construction and placement of the lifting cylinder 32 and attachment points allows the mast weldment 12 when horizontal, to be located at a convenient working height permitting efficient assembly and/or placement of the structure or column to be raised.

Once the work piece or column has been raised to the desired vertical position, the raise button in the push button station 28 is released, stopping the hydraulic power pack 31 and closing the selenoid valve (not shown). Should the mast weldment 12 not be stopped by the push button station 28 upon reaching the vertical position, a limit switch 36 will automatically perform the same function, stopping the device. Once raised, the device, FIG. 1, with the structure attached, may be moved on the floor as desired for exact placement manually with little effort.

With the structure or column safely secured, the clamping cylinders 13 are released by turning a manual valve on the hydraulic hand pump 16. The flexible hose 17 on the manual hand pump 16 allows the operator to place themself in any location for safety or control purposes when releasing the clamping cylinders 13. This is also true when using the push button station 28 with its' retractable cord 29 to raise or lower the mast weldment. To lower the mast weldment, the operator pushes the down or lower button on the push button station 28. This starts the hydraulic power pack 31 and opens the proper selenoid valve (not shown) contained therein thus causing the dual acting lifting cylinder 32 to retract under power allowing the mast weldment 12 to return to the horizontal position. Should the operator fail to stop the mast weldment at its proper limit of travel by releasing the push button on the push button station 28, a limit switch 37 shuts the device off automatically.

As previously described, two separate hydraulic systems are used. One medium pressure electric hydraulic system is used to raise and lower the mast weldment 12 and a manual high pressure hydraulic system for clamping. The electric hydraulic system supplies a high volume at a lower pressure raising and lowering the mast weldment 12 quickly. Should a power failure or damage to the system occur, a manual valve at the raising cylinder automatically lowers the mast weldment at a very slow pre-set rate. The manual system provides very close control of the clamping pressure to prevent damage to the material clamped and greater simplicity and fewer parts for improved reliability and safety. In addition, the manual system provides the high pressure needed for the very short stroke clamping cylinders.

Thus it will be seen that I have provided a unique crane-like apparatus so constructed as to enable ease of assembly of a structure by clamping it while in the horizontal position close to the floor and thereafter pivotally, lifting the structure, by a hydraulic cylinder, to a vertical normal position so that the assembled structure can be easily moved and erected in any desired location.

While I have illustrated and described a single specific embodiment of my invention, it will be understood that this is by way of illustration only and that various changes and modifications may be contemplated in my invention within the scope of the following claims.

I claim:

1. A hydraulic crane-like structure comprising a wheeled base supporting a vertical frame structure on which is pivotally mounted a mast;—the improvement comprising a pair of clamping arms adjustably attached at selective points at right angles to said mast, in spaced relationship, said mast being in the form of a weldment including flanges having spaced holes through which bolts may be selectively extended from corresponding holes in said clamping arms so as to become fastened to said weldment at selective positions therealong, and clamping means mounted on said clamping arms for temporarily attaching a load after it is assembled on said mast while the mast is in the horizontal position, said clamping means comprising hydraulic cylinder means including a piston for pressing against said load, said hydraulic cylinder means being adjustably mounted at selective positions along said clamping arms, said clamping arms having holes extending longitudinally thereof onto which said clamping means may be selectively attached for temporarily holding said load at selective positions along said clamping arms whereby when said mast is hydraulically pivoted to the vertical position, the assembled load can be wheeled to a selected location and mounted vertically.

* * * * *